United States Patent Office 3,546,106
Patented Dec. 8, 1970

3,546,106
DECOMPOSING CUPROUS TRIFLUOROACETATE-OLEFIN COMPLEX WITH A PARAFFIN COUNTER-SOLVENT
George C. Blytas, Kensington, Calif., assignor to Shell Oil Company, New York, N.Y., a corporation of Delaware
Filed Mar. 27, 1969, Ser. No. 811,045
Int. Cl. C07c 11/02
U.S. Cl. 208—308                              7 Claims

ABSTRACT OF THE DISCLOSURE

Monoolefins are separated from mixtures with closely boiling paraffins by contact with a propionitrile solution of cuprous trifluoroacetate followed by contact of the resulting monoolefin-cuprous complex with a paraffin counter-solvent having a boiling point different from the boiling point of the monoolefin.

BACKGROUND OF THE INVENTION

The separation of olefinically unsaturated hydrocarbons from hydrocarbons of lesser degrees of unsaturation with a solution of a cuprous salt is known in the art. One useful process is that of Dunlop et. al., U.S. 3,401,112, issued Sept. 10, 1968, wherein an anhydrous solution of cuprous trifluoroacetate in propionitrile is employed. In this purocess an olefin is separated from a hydrocarbon mixture containing that olefin and close boiling, more saturated hydrocarbons by selectively forming an olefin-cuprous complex and subsequently separating and decomposing the complex.

The decomposition of the cuprous complex is accomplished by heating at elevated temperatures, generally to about 80° C. or higher. Ideally the cuprous complex decomposes to liberate the olefin and to reform the cuprous salt, cuprous trifluoroacetate. During the decomposition, however, the elevated temperature employed causes serious thermal decomposition of the cuprous salts as well, as the cuprous ion tending to be oxidized to the cupric state or to disproportionate to the cupric ion and metallic copper. This problem is accentuated when higher molecular weight olefins, such as the plasticizer and detergent ragne olefins, are being separated since it is often desirable in such separations to remove these olefins from the cuprous salt-containing solution by distillation immediately following decomposition. As a result, the cuprous salts are subjected to distillation temperatures which in the case of these higher olefins are generally relatively higher (i.e., >120° C.). Clearly, a process which effects decomposition of the cuprous-olefin complex and isolation of the olefin from the cuprous salt at lower temperatures would be desirable.

STATEMENT OF THE INVENTION

It has now been found that separation of monoolefins of up to 20 carbon atoms per molecule from a hydrocarbon mixture containing closely boiling saturated hydrocarbons (paraffins) is effected at temperatures below about 75° C. by an improved process which comprises:

(1) intimately contacting the monoolefin-containing mixture with a solution of cuprous trifluoroacetate in propionitrile thereby complexing the monoolefin with the cuprous salt, (2) separating as one phase the noncomplexed paraffins, and as a second phase the resulting cuprous trifluoroacetate-monoolefin complex and propionitrile, (3) countercurrently intimately contacting the complex-containing phase a temperature below about 75° C. with a paraffin counter-solvent having a boiling point substantially different from the boiling point of the monoolefin, (4) separating the resulting mixture into two phases one containing as major components monoolefin and paraffin counter-solvent the other containing as major components cuprous trifluoroacetate and propionitrile, (5) recovering the monoolefin from the differently boiling paraffin by distillation.

Figure 1:
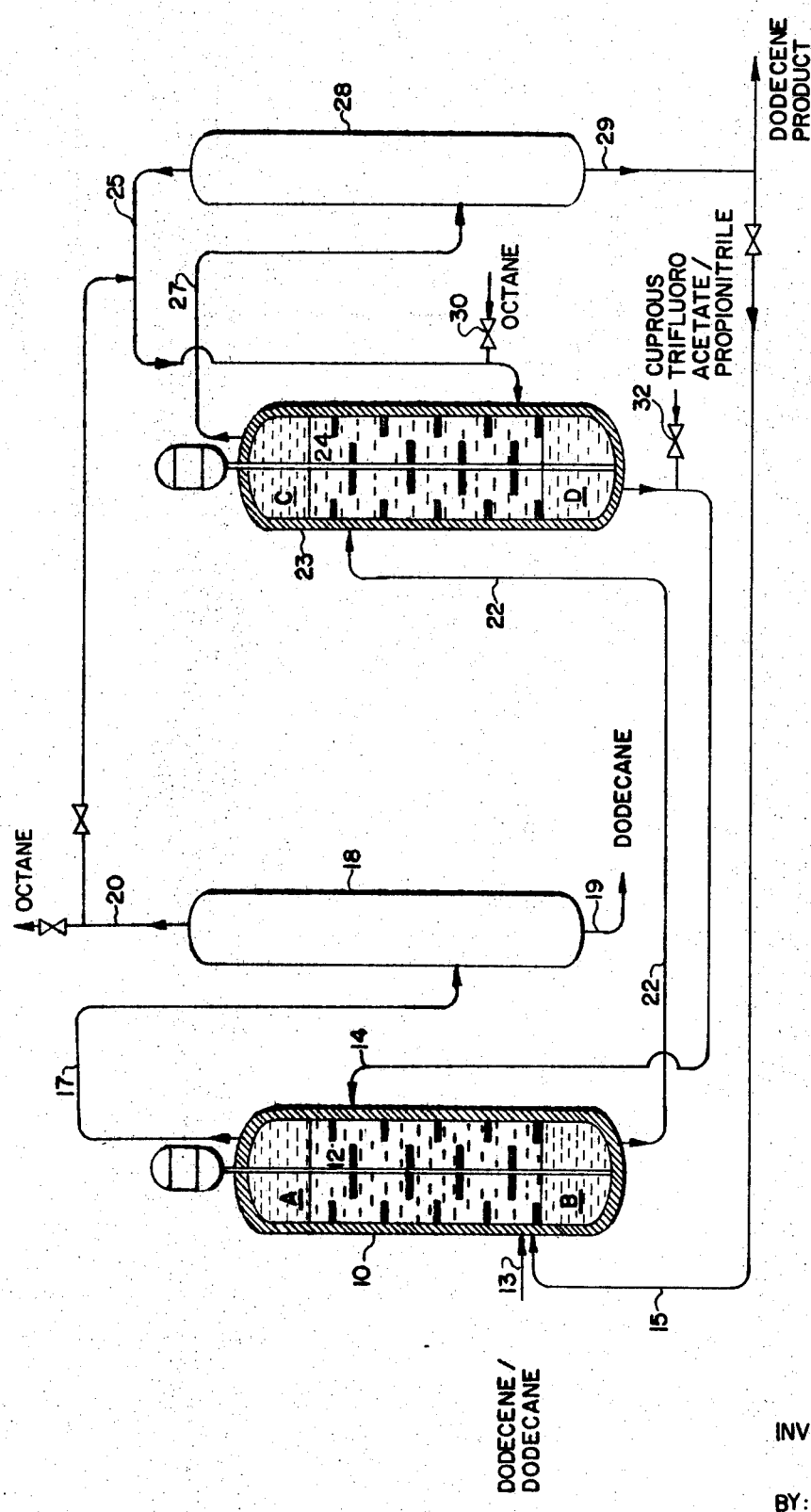
Figure 2:
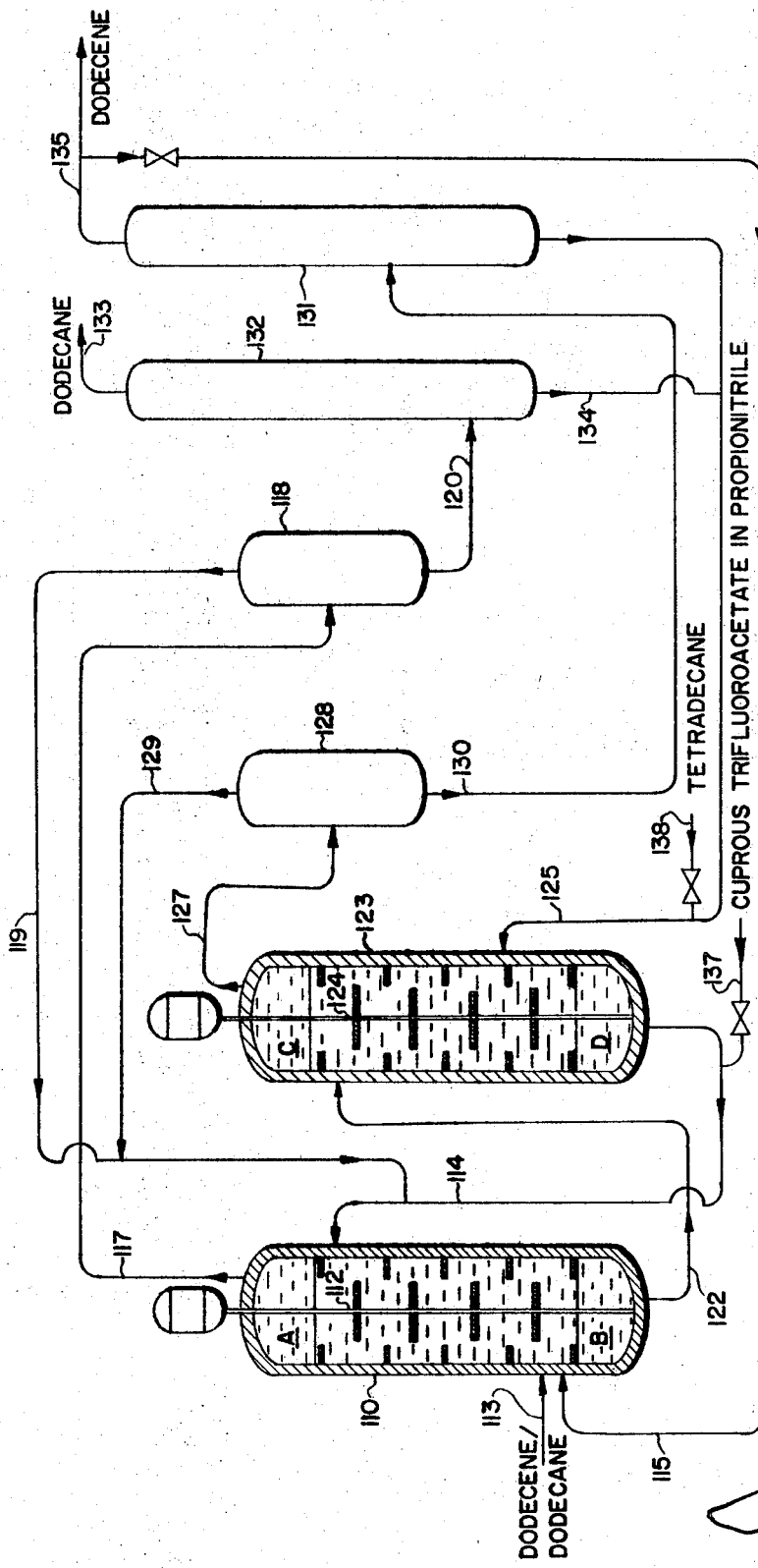

The process of the invention is characterized by effective separation of monoolefins from close boiling paraffins at temperatures far lower than conventionally used. This process will be described in detail below with reference to the accompanying drawing wherein the two figures illustrate, more or less diagrammatically, elevational views of two forms of systems suitable for carrying out the invention. FIG. 1 illustrates a form of system suitable when as counter-solvent is used a paraffin lower boiling than the monoolefin to be separated, while FIG. 2 illustrates a form of system suitable for use with higher boiling counter-solvent.

DESCRIPTION OF THE PREFERRED EMBODIMENTS

The invention is particularly advantageously employed for the separation of mixtures of closely boiling saturated and olefinic aliphatic hydrocarbons having from 5 to 20 carbon atoms, preferably 6 to 16 carbon atoms. For example, it is suitable for the separation of hexene-1 from hexane, 2-methylpentene-2 from 2-methylpentane, 3-ethylene-2 from 3-ethylhexane, decene-1, -2, -3 or -4 from decane, dodecenes from dodecanes, hexadecenes from hexadecanes and eicosene from eicosane. The process is especially suitable for the separation of linear aliphatic internal and terminal monoolefins having from about 6 to about 12 carbon atoms per molecule and linear aliphatic terminal monoolefins having from about 13 to about 16 carbon atoms per molecule from close boiling linear paraffins, such as for example the separation of hexene-1 or -3 from hexane, nonene-1, -2 or -4 from nonane, dodecane-1 from dodecane and hexadecene-1 from hexadecane.

The concentration of monoolefin in the monoolefin-paraffin feedstock may vary widely. Generally suitable are monoolefin concentrations of at least about 5% by weight with monoolefin concentrations of at least about 10% by weight being preferred and concentrations of at least about 15% being especially preferred. Although suitable for use at high olefin concentrations, in general it is to be used when the olefin concentration is no more than about 85% by weight.

The solution of cuprous trifluoroacetate used in the process is prepared by more or less conventional methods. It can be prepared by simply dissolving cuprous trifluoroacetate salt of reasonable purity in propionitrile. Alternatively, cuprous trifluoroacetate in propionitrile solutions are conveniently prepared by contacting cuprous oxide with excess of trifluoroacetic anhydride in propionitrile. The solutions of cuprous trifluoroacetate in propionitrile employed contain at least about 5% by weight of cuprous copper with solutions containing from about 10% by weight to about 24% by weight cuprous copper being preferred and solutions containing from about 16% by weight to about 22% by weight being especially preferred.

It is generally preferred to use substantially anhydrous of cuprous trifluoroacetate as water tends to cause disproportionation of the cuprous ions. Solutions containing not more than about 2% by weight of water are especially preferred.

The ratio of amount of cuprous trifluoroacetate solution to monoolefin-parafin mixture is dependent on the concentration of the cuprous salt solution and the proportion of monoolefin in the mixture. Generally, a molar excess of cuprous salt is employed with molar ratios of cuprous salt to monoolefin of from about 1.5 to 1 to about 40 to 1 being suitable. When the cuprous salt solution and the monoolefin-paraffin mixture are within the preferred concentrations, molar ratios of cuprous salt to monoolefin of from about 3 to 1 to about 20 to 1 are preferred.

The contacting of the liquid cuprous trifluoroacetate-propionitrile solution was the liquid monoolefin-paraffin mixture and subsequent separation of paraffin and propionitrile-copper monoolefin complex phases may be carried out in any suitable apparatus such as a series of separate but connected mixers and settlers or a rotating disc contactor. Preferred contacting apparatus permits intimate contacting and countercurrent passage of the liquid monoolefin-paraffin mixture and the cuprous trifluoroacetate solution. In order to promote the intimate contacting of the hydrocarbon mixture with the cuprous solution it is generally advisable to provide a contacting zone having a plurality of mixing stages. Although the actual number of theoretical mixing stages required is dependent on the separation being effected and the product purity desired, generally, contacting zones of at least about 2 theoretical mixing stages are suitable with zones having at least about 5 theoretical mixing stages being generally preferred. The concept "theoretical mixing stage" makes it possible to indicate more precisely the character of the flow through the contacting zone. A zone is said to have "$n$" theoretical mixing stages if the spread of the residence time of the volume of the stream supplied is equal to that of "$n$" ideal mixers connected in series. In an ideal mixer the composition of its contents is uniform. In the case of two theoretical mixing stages, the spread in residence time of the monoolefin-paraffin mixture, which is taken to be the dispersed phase during the countercurrent contact of the mixture with the cuprous trifluoroacetate-propionitrile solution, is fairly small, so that each volume element of the contents of the contacting zone is subject to approximately the same treatment. Any known procedure available for creating a plurality of mixing stages in the contacting zone may be used. Particularly preferred is the use of an upright cylindrical contactor containing a plurality of annular stationary baffles in which a substantially axially positioned stirring device with spaced-apart parallel rotating discs is present, as described, for example, in U.S. Pat. 2,601,674 and in "Chemical Engineering Progress," vol. 51 (1955), pages 141–146.

Such apparatus not only provides thorough contacting but also effects separation of the paraffin phase from the monoolefin-cuprous complex containing propionitrile phase.

The paraffin content of the monoolefin final product may be reduced by the injection of an enrichment stream into the contactor at a point between the monoolefin-parafin feed injection point and the point at which the propionitrile solution of copper-olefin complex is removed. This enrichment step is generally necessary to produce monoolefins of greater than about 85% purity. Suitable enrichment streams include a portion of product olefin and paraffin counter solvents. A preferred enrichment stream is a portion of product olefin.

The contacting and separation steps may be carried out at temperatures below about 75° C. at which the monoolefin and paraffin are liquid. Higher temperatures, though effective, result in greater losses of cuprous salts. Preferred temperatures are between about 25° C. and about 60° C.

Olefin is liberated from the cuprous trifluoroacetate complex by contacting with a paraffin counter-solvent. The choice of counter-solvent is dependent on the monoolefin being separated and the method of recovery employed to recover the monoolefin from the paraffin counter-solvent. The monoolefin is generally recovered from the counter-solvent by distillation. When distillation is employed, it is desirable to employ as counter-solvent a paraffin differing substantially in boiling point from the monoolefin being recovered so as to facilitate the recovery. For example, hexene may be readily recovered by distillation from nonane or decane, decene from hexane or tetradecane, dodecene from octane or hexadecane. Generally, paraffin counter-solvents having similar structures to that of the monoolefin and differing in number of carbon atoms per molecule from the monoolefin being separated by at least 1 carbon atom are suitable when distillation is employed. Paraffin counter-solvents differing in boiling point from the monoolefin by from 15–75° C. are preferred, and counter-solvents differing in boiling point from the monoolefin by from 30–75° C. are especially preferred.

Contact between the monoolefin-cuprous complex solution in propionitrile and the paraffin counter-solvent and separation of the resulting olefin-paraffin counter-solvent phase from the cuprous trifluoroacetate in propionitrile phase may be effected by any suitable apparatus. Preferred apparatus permits intimate contacting and countercurrent passage of the olefin-cuprous complex solution and the counter-solvent. Apparatus which provides a contacting zone comprising a plurality of theoretical mixing stages is advisable. Particularly preferred apparatus is a rotating disk contactor of the type and size already described as preferred for contacting monoolefin-paraffin feed mixture with cuprous trifluoroacetate solution in propionitrile. Such apparatus in this service not only provides thorough contacting but also effects separation of the counter-solvent-monoolefin phase from the cuprous trifluoroacetate solution.

This contacting and separation may be carried out at temperatures below above 75° C. at which the olefin and the paraffin counter-solvent are liquid with temperatures from about 25° C. to about 60° C. being preferred.

The monoolefin is separated from the counter-solvent by conventional means. The generally used method is distillation although other methods such as for example fractional crystallization, may be employed.

The process of the invention can be further described with reference to the figures. As exemplary systems, the separation of dodecene-1 from dodecane using as counter-solvent octane and tetradecane, are illustrated in FIG. 1 and FIG. 2, respectively.

Referring now to FIG. 1, vertical rotating disc contactor 10, defining a contacting zone, is provided with baffles and an axially positioned stirrer 12 comprising a shaft with a plurality of spaced flat discs. A liquid mixture of dodecene-1 and dodecane is introduced into a lower reaction of contactors 10 via conduit 13. A liquid solution of cuprous trifluoroacetate in propionitrile is introduced in controlled amount via conduit 14 into an upper section of vessel 10 and passes in countercurrent through the liquid mixture of dodecene-1 and dodecane. The contacting zone of contactor 10 functions as a mixer, intimately contacting the two liquids. To increase olefin purity, a controlled amount of product olefin is optionally introduced as enrichment liquid near the bottom of contactor 10 via conduit 15.

Contactor 10 also functions as a phase separator, separating dodecane phase A, and dodecene-cuprous complex in propionitrile phase B. Phase A, dodecane containing minor amounts of dodecene, octane and propionitrile, is removed via conduit 17 to distillation column 18 where at least a part of the octane and propionitrile is taken overhead, and discarded or returned to the system via conduit 20. The bottom product, consisting essentially of dodecane, with a minor amount of dodecene is removed through conduit 19. Phase B, a liquid comprised of dodecene-cuprous trifluoroacetate complex in propionitrile and minor amounts of dodecane is removed from 10 via conduit 22 to another separate rotating disc contactor 23.

Contactor 23 is provided with stirrer 24, essentially similar to stirrer 12. Liquid counter-solvent, essentially octane, is introduced in controlled amount via conduit 25 so that it passes through the olefin-cuprous complex in propionitrile solution in counter-solvent. Contactor 23 functions as a mixer, intimately contacting the counter-solvent with the dodecene-cuprous trifluoroacetate solution in propionitrile, and also functions as a phase separator, separating as phases C and D respectively, a phase comprised of dodecene, octane and minor amounts of propionitrile and dodecane, and an essentially dodecene-free cuprous trifluoroacetate in propionitrile phase which result from the intimate contacting.

Phase D is removed from contactor 23 and returned to contactor 10 via conduit 14. Phase C is removed from contactor 23 via conduit 27 to distillation column 28 where essentially all of the octane and propionitrile is taken overhead and returned to contactor 23 via line 25. Olefin product, consisting essentially of dodecane, with minor amounts of dodecane, is removed via conduit 29. A portion of this product is optionally recycled via conduit 15. Make up octane and make up cuprous trifluoroacetate in propionitrile are added via valved lines 30 and 32, respectively.

Referring now to FIG. 2, a liquid mixture comprising dodecene-1 and dodecane is introduced via conduit 113 into rotating disc contactor 110, provided with stirrer 112. A liquid solution of cuprous trifluoroacetate in propionitrile is introduced in controlled amount via conduit 114. Olefin is optionally introduced into chamber 110 as enrichment liquid via conduit 115. Upper phase A, comprising dodecane and minor amounts of dodecene, propionitrile and tetradecane is removed via conduit 117 to flasher 118 where at least a part of the propionitrile is taken overhead and generally returned to contactor 110 via conduit 119, and bottoms comprising dodecane and minor amounts of dodecene and tetradecane is removed via conduit 120. Lower phase B, a liquid comprised of dodecene-cuprous trifluoroacetate complex in propionitrile and minor amounts of dodecane, is removed from chamber 110 via conduit 122 to another rotating disc contactor 123. Contactor 123 is provided with stirrer 124, similar to stirrer 112. Liquid counter-solvent comprising tetradecane is introduced in controlled amount via conduit 125 into contactor 123 so that it passes through the olefin-cuprous complex in propionitrile solution in counter-solvent. Upper phase C and lower phase D are formed. Phase D, comprising essentially dodecene-free cuprous trifluoroacetate in propionitrile is removed and returned to contactor 110 via conduit 114. Phase C, comprising dodecene, tetradecane and minor amounts of propionitrile and dodecane is removed via conduit 127 to flasher 128 where essentially all of the propionitrile is taken overhead and returned to contactor 110 via conduit 129. Bottoms comprising dodecene and tetradecane are removed from flasher 128 and introduced via conduit 130 into distillation column 131 wherein a bottoms fraction comprising tetradecane is separated and returned to contactor 123 via conduit 125. Additional tetradecane is recovered in distillation column 132 by the separation of the bottoms from flasher 118 into a distillate fraction comprising dodecane which is removed via conduit 133 and a bottoms fraction comprising tetradecane which is removed via line 134 and returned to contactor 123. Olefin product, comprising dodecene with a minor proportion of dodecane is removed from distillation column 131 via line 135. A portion of this product may optionally be returned to contactor 110 via line 115. Make-up cuprous trifluoro-acetate solution is added via valved conduit 137 and make-up tetradecane is added via valved conduit 138.

The process of the invention is further illustrated by the following example:

A hydrocarbon feed composed of 20% by weight dodecene-1 and 80% by weight dodecane is injected continuously 2 theoretical mixing stages from the bottom of a vertical cylindrical rotating disc contactor having 6 theoretical mixing stages wherein it ascends countercurrent to a descending stream composed of 90% by weight of a 52% by weight solution of cuprous trifluoroacetate in propionitrile and 8% of octane. The weight of cuprous salt mixture is approximately 4.4 times that of the hydrocarbon feed. Reflux composed of about 90% by weight dodecene-1 and the remainder dodecane is injected into the contactor below the bottom mixing stage in amount equivalent to about 0.4 times the feed by weight. The rotating disk contactor is operating at 35° C. Cuprous trifluoroacetate in propionitrile and extracted dodecene-1, with minor amounts of dodecane and octane, is removed continuously from the bottom of the rotating disk contactor and passed to a second vertical rotating disk contactor of about 5 theoretical mixing stages approximately 1 stage from the top where it descends countercurrent to a 35° C. octane with propionitrile contamination counter-solvent flow of approximately 0.8 times its weight. Cuprous trifluoroacetate in propionitrile with about 8% by weight octane is removed from the bottom of this contactor and is returned as cuprous salt mixture to the first contactor. The octane stream carries the dodecene-1 with some propionitrile and dodecane impurities out the top of the contactor. This extract phase is passed to the 4th tray of a 15-tray Oldershaw-type distillation column operating at the following conditions: average reboiler temperature 130° C.; average column pressure 50 mm.: reflux/distillate ratio 0.2; overhead, 93% of feed.

Olefin product composed of about 90% dodecene-1 and about 10% dodecane is removed continuously from the reboiler, a portion being returned to the first rotating disk contactor as enrichment liquid. Octane with propionitrile is taken overhead, condensed and returned to the second rotating disk contactor as counter-solvent.

Paraffin raffinate, composed of dodecane with dodecene-1, octane, and propionitrile in minor amount, removed from the top of the first rotating disk contactor, is fed to the 15th tray of a 15-tray paraffin purification column operated at the following conditions: reboiler temperature 135° C.; column pressure 50 mm.; reflux/distillate 0.3; overhead percent of feed 30.

Octane and propionitrile are recovered as distillate and combined with the octane counter-solvent stream to the second rotating disk contactor. The purified paraffin raffinate is composed of 97.5% dodecane and 2.5% dodecene-1.

I claim as my invention:

1. In the process of separating mixtures of closely boiling hydrocarbons consisting essentially of monoolefins and paraffins of from 5 to 20 carbon atoms to the molecule by selectively complexing the monoolefins with cuprous trifluoroacetate in propionitrile and removing the non-complexed paraffin in one phase from a resulting cuprous trifluoroacetate-monoolefin complex in a second phase, the improvement which comprises contacting the complex-containing phase at a temperature below about 75° C. with a paraffin counter-solvent having a boiling point different from the boiling point of the monoolefins to form a cuprous trifluoroacetate-containing phase and a substantially cuprous trifluoroacetate-free, monoolefin- and differently boiling paraffin-containing hydrocarbon phase.

2. The process of claim 1 wherein the hydrocarbons to be separated have from 6 to 16 carbon atoms to the molecule.

3. The process of claim 1 wherein the monoolefins are selected from the group consisting of linear aliphatic terminal olefins of from 6 to 16 carbon atoms to the molecule and linear aliphatic internal olefins of from 6 to 12 carbon atoms to the molecule.

4. The process of claim 1 wherein the paraffin counter-solvent differs from the monoolefins in boiling point by at least 15° C.

5. The process of decomposing a solution of a monoolefin-cuprous trifluoroacetate complex in propionitrile, wherein the monoolefin has from 5 to 20 carbon atoms to the molecule, which comprises contacting, at a temperature below 75° C., the solution with paraffin counter-solvent having a boiling point different from that of the monoolefin.

6. The process of claim 5 wherein the monoolefin is selected from the group consisting of linear aliphatic terminal olefins of from 6 to 16 carbon atoms to the molecule and linear aliphatic internal olefins of from 6 to 12 carbon atoms to the molecule.

7. The process of claim 5 wherein as counter-solvent is employed a paraffin differing from the monoolefin in boiling point by at least 15° C.

References Cited

UNITED STATES PATENTS

| 2,386,357 | 10/1945 | Schulze et al. | 260—681.5 |
| 2,930,823 | 3/1960 | Kronig et al. | 260—681.5 |
| 3,401,112 | 9/1968 | Dunlop et al. | 208—308 |

HERBERT LEVINE, Primary Examiner

U.S. Cl. X.R.

260—677